(12) United States Patent
Ichii et al.

(10) Patent No.: US 7,663,657 B2
(45) Date of Patent: Feb. 16, 2010

(54) OPTICAL SCANNING DEVICE AND IMAGE FORMING APPARATUS

(75) Inventors: Daisuke Ichii, Kanagawa (JP); Yoshinori Hayashi, Kanagawa (JP); Takeshi Ueda, Tokyo (JP); Kohji Sakai, Tokyo (JP); Kenichiro Saisho, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 26 days.

(21) Appl. No.: 11/782,268

(22) Filed: Jul. 24, 2007

(65) Prior Publication Data

US 2008/0025759 A1    Jan. 31, 2008

(30) Foreign Application Priority Data

Jul. 27, 2006  (JP)  ............................. 2006-205095
May 11, 2007  (JP)  ............................. 2007-126319

(51) Int. Cl.
   *B41J 15/14*  (2006.01)
   *B41J 27/00*  (2006.01)

(52) U.S. Cl. ...................... 347/244; 347/258

(58) Field of Classification Search ................ 347/230, 347/238, 241, 244, 256, 258; 359/204, 205
See application file for complete search history.

(56) References Cited

U.S. PATENT DOCUMENTS

| | | | |
|---|---|---|---|
| 6,172,787 B1* | 1/2001 | Naiki | ........................ 359/204 |
| 6,326,992 B1* | 12/2001 | Inoue et al. | ................. 347/241 |
| 6,788,444 B2 | 9/2004 | Suzuki et al. | |
| 7,002,613 B2* | 2/2006 | Beier et al. | ................. 347/238 |
| 7,068,296 B2 | 6/2006 | Hayashi et al. | |
| 7,106,483 B2 | 9/2006 | Hayashi et al. | |
| 7,164,516 B2 | 1/2007 | Hayashi et al. | |
| 7,218,432 B2 | 5/2007 | Ichii et al. | |
| 2003/0067533 A1 | 4/2003 | Omori et al. | |
| 2005/0093955 A1 | 5/2005 | Izumi et al. | |
| 2006/0077500 A1* | 4/2006 | Hayashi et al. | ............. 359/205 |
| 2006/0187294 A1 | 8/2006 | Saisho et al. | |

(Continued)

FOREIGN PATENT DOCUMENTS

JP    10-333070    12/1998

(Continued)

OTHER PUBLICATIONS

U.S. Appl. No. 11/873,635, filed Oct. 17, 2007, Hayashi, et al.

(Continued)

*Primary Examiner*—Hai C Pham
(74) *Attorney, Agent, or Firm*—Oblon, Spivak, McClelland, Maier & Neustadt, L.L.P.

(57) ABSTRACT

An optical scanning device includes a light source having light emitting points for emitting light beams, a coupling optical element that couples the light beams, a deflecting unit that deflects and scans the light beams, and a scanning optical system that focus the light beams to form an image. The optical scanning device satisfies the following condition: $F \tan(\theta/2) + A < D/0.7$ where A is the maximum distance between the light emitting points and an optical axis of the coupling optical element, $\theta$ is a divergence angle (full-width half-maximum) of the light beams, F is a focal length of. the coupling optical element, and D is an effective radius of the coupling optical element.

6 Claims, 14 Drawing Sheets

U.S. PATENT DOCUMENTS

| | | |
|---|---|---|
| 2006/0232659 A1 | 10/2006 | Hayashi et al. |
| 2006/0245009 A1 | 11/2006 | Akiyama et al. |
| 2006/0284968 A1 | 12/2006 | Hayashi et al. |
| 2007/0058255 A1 | 3/2007 | Imai et al. |

FOREIGN PATENT DOCUMENTS

| | | |
|---|---|---|
| JP | 11-223783 | 8/1999 |
| JP | 2001-272615 | 10/2001 |
| JP | 2001-350111 | 12/2001 |
| JP | 2002-214556 | 7/2002 |
| JP | 2003-337295 | 11/2003 |
| JP | 2004-126192 | 4/2004 |
| JP | 2005-258392 | 9/2005 |
| JP | 2006-85487 | 3/2006 |

OTHER PUBLICATIONS

U.S. Appl. No. 11/877,020, filed Oct. 23, 2007, Hayashi, et al.
U.S. Appl. No. 12/110,862, filed Apr. 28, 2008, Ichii, et al.
U.S. Appl. No. 12/190,182, filed Aug. 12, 2008, Ichii et al.
U.S. Appl. No. 12/189,430, filed Aug. 11, 2008, Saisho.
U.S. Appl. No. 12/174,899, filed Jul. 17, 2008, Saisho et al.

* cited by examiner

DEPTH CURVE IN MAIN SCANNING DIRECTION

DEPTH CURVE IN SUB-SCANNING DIRECTION

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document, 2006-205095 filed in Japan on Jul. 27, 2006 and 2007-126319 filed in Japan on May 11, 2007.

BACKGROUND OF THE INVENTION

1. Field of the Invention

The present invention relates to an optical scanning device and an image forming apparatus.

2. Description of the Related Art

In image forming apparatuses such as digital copiers and laser printers, high-density image formation using optical scanning has been progressing, and a small-sized beam spot on a photosensitive element is demanded of the image forming apparatus to meet the progress. In addition, there is a continuous demand for high-speed image formation, and thus it is desired to realize an optical scanning device capable of meeting these demands. As a means to achieve high-speed and high-density image formation, rotation speed of a polygon scanner may be increased. With such means, however, there arise problems of increase in power consumption and noise, heat generation, and degradation of durability.

As another means to achieve high-speed and high-density image formation, an image forming apparatus using a multibeam writing system has been put to practical use. More specifically, the multibeam writing system uses a light source including a plurality of light emitting points, and scans one surface with a plurality of beams. The light source including the light emitting points on one element, however, has some problems as follows:

1. Heat generated by electrically driving light-emitting elements causes crosstalk between the light-emitting elements, and the crosstalk makes their property unstable.
2. The more the number of light-emitting elements increases, the farther light emitting points are apart from the optical axis of an optical system. Therefore, it is difficult to ensure optical characteristics for the entire light fluxes. The optical characteristics mentioned here indicate light-use efficiency, field curvature, and the like.

The following are known as technologies related to solution of these problems.

Japanese Patent Application Laid-Open No. 2001-272615 discloses a technology for reducing influence of thermal crosstalk by providing light emitting points at equal spacing and improving an accumulation rate without bringing spaces between the light emitting points closer to each other.

Japanese Patent Application Laid-Open No. 2001-350111 discloses a technology for obtaining high-density images by reducing non-uniformity of density of a recorded image while ensuring scanning speed to avoid the problem of thermal crosstalk. More specifically, the non-uniformity is reduced by determining each space between light emitting points of a light source and a direction in which the light emitting points are arrayed in a multibeam scanning device.

Japanese Patent Application Laid-Open Nos. 2004-126192 and 2005-258392 disclose a technology for reducing variation of a focus position due to temperature change by combining a diffractive surface and a refractive surface in an optical system provided in an upstream side of a deflector.

Japanese Patent Application Laid-Open Nos. 2003-337295 and H11-223783 disclose a technology for correcting variation of a focus position, due to a scanning optical system in association with temperature change, by changing the power of a diffractive portion.

Japanese Patent Application Laid-Open No. 2002-214556 discloses a technology for correcting variation of a focus position due to temperature change by combining at least three lenses in an optical system provided in an upstream side of a deflector without using a diffractive surface.

Japanese Patent Application Laid-Open No. H10-333070 discloses a technology for correcting variation of a focus position by providing a diffractive optical surface on a scanning lens.

The technologies described in Japanese Patent Application Laid-Open Nos. 2001-272615 and 2001-350111 deals with the first problem, but both the patent documents do not teach or suggest the solution to the second problem. Japanese Patent Application Laid-Open No. 2004-126192 also does not teach or suggest the solution to the problem addressed by the present invention.

Japanese Patent Application Laid-Open No. 2005-258392 mentions the multibeams, but does not teach or suggest the solution to the problems when the multibeams are used.

Japanese Patent Application Laid-Open Nos. 2003-337295 and H11-223783 also do not mention anything about the multibeams such that the one photosensitive element is scanned with the beams.

It is desirable to push ahead resinification of a constructed lens to achieve low cost of an optical scanning device and an image forming apparatus using the same. As for a glass lens, the curvature of a lens surface and the thickness and refractive index of the lens vary caused by the change of environmental temperature, and the refractive index of the lens varies caused by variation of oscillation wavelength of a semiconductor laser which is the light source. As a result, a focus position changes, and a spot diameter thereby increases, resulting in image degradation. As for a resin lens, the curvature of a lens surface and the thickness and refractive index of the lens vary more largely than these of the glass lens caused by the change of environmental temperature, and the refractive index of the lens varies more largely than that of the glass lens caused by the variation of wavelength of a semiconductor laser which is a light source. As a result, image degradation is largely affected thereby.

To solve this problem, there is the method of correcting variation of the refractive index by combining at least three lenses in the optical system provided in the upstream of the deflector as is described in Japanese Patent Application Laid-Open No. 2002-214556. However, this structure has a disadvantage such that the increase of the number of lenses causes cost increase. Moreover, the technology described in Japanese Patent Application Laid-Open No. 2002-214556 also requires one piece of glass lens, and this is also a factor of cost increase.

There is another method of correcting variation of the refractive index by providing a diffractive optical surface on the scanning lens as is described in Japanese Patent Application Laid-Open No. H10-333070. However, the scanning lens has a wide area for passage of light flux, and the diffractive optical surface has to be formed on the wide area, which takes time, and this causes cost increase.

In all the patent documents, there is no technological disclosure about the second problem which is specific to the multibeam. The diffractive optical surface has a specific shape such that each interval between diffraction gratings is shorter as the diffraction gratings are apart from the optical axis. Therefore, higher machining technology is required for an area which is farther from the axis, and this may easily cause manufacturing error to occur. If the manufacturing error occurs, then diffraction efficiency varies, which causes the light amount on the surface to be scanned to change for each light flux. Thus, images provided by the image forming apparatus have non-uniform density.

SUMMARY OF THE INVENTION

It is an object of the present invention to at least partially solve the problems in the conventional technology.

According to an aspect of the present invention, an optical scanning device includes a light source that includes light emitting points for emitting a plurality of light beams, a first coupling optical element that couples the light beams into a light flux, a deflecting unit that deflects and scans the light flux, and a scanning optical system that focuses the light flux from the deflecting unit onto an imaging surface to form an image. The optical scanning device satisfies:

$$F \tan(\theta/2) + A < D/0.7$$

where A is the maximum distance between the light emitting points and an optical axis of the first coupling optical element, θ is a full-width half-maximum divergence angle of the light beams, F is a focal length of the first coupling optical element, and D is an effective radius of the first coupling optical element.

According to another aspect of the present invention, an optical scanning device includes a light source that includes light emitting points for emitting a plurality of light beams, a first coupling optical element that couples the light beams into a light flux, a deflecting unit that deflects and scans the light flux, and a scanning optical system that focuses the light flux from the deflecting unit onto an imaging surface to form an image. The light emitting points, except a light emitting point on an optical axis, are all arranged in concentric rings, each formed by at least three light emitting points.

According to still another aspect of the present invention, an optical scanning device includes a light source that includes light emitting points for emitting a plurality of light beams, a first coupling optical element that couples the light beams into a light flux, a deflecting unit that deflects and scans the light flux, and a scanning optical system that focuses the light flux from the deflecting unit onto an imaging surface to form an image. The light emitting points are arranged in a parallelogram area having an acute angle, and no light emitting point contributing to optical scanning exists at least near a vertex of the acute angle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1A:
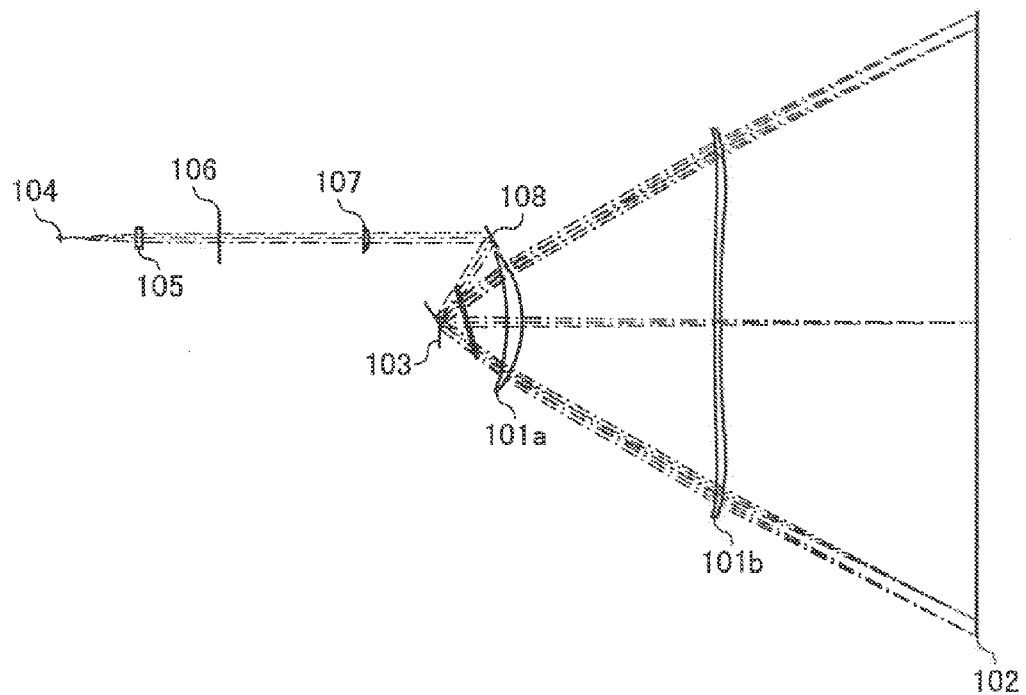
FIG. 1A is a plan view of an optical scanning device according to a first embodiment of the present invention in a main scanning direction.
Figure 1B:
FIG. 1B is a side view of the optical scanning device in a sub-scanning direction.

FIGS. 1A and 1B depict optical arrangement of an optical scanning device according to a first embodiment of the present invention. More specifically, FIG. 1A depicts the optical arrangement in a main-scanning plane, and FIG. 1B depicts that in a sub-scanning plane. The optical scanning device has an incident optical system including a light source 104, a coupling lens 105, an aperture 106, and a linear-image forming lens 107. The optical scanning device also has a scanning optical system including a first scanning lens 101a and a second scanning lens 102b. An optical deflector 103 is provided between the incident optical system and the scanning optical system. An incident mirror 108 is arranged in the incident optical system to cause light flux to enter a deflection reflecting surface of the optical deflector 103 at an appropriate angle.

In FIGS. 1A and 1B, the coupling lens 105 couples divergent light beams emitted from the light source 104 into substantially parallel light flux for optical elements provided in the downstream thereof. The light flux having passed through the coupling lens 105 passes through the aperture 106, where the shape of its lateral cross section is shaped, and then passes through the linear-image forming lens 107. The light flux having passed through the linear-image forming lens 107 is converged only in the sub-scanning direction to form a line image long in the main scanning direction near the deflection reflecting surface of the optical deflector 103. The optical deflector 103 is a rotating polygon mirror that rotates at constant high speed by a motor, and an incident light flux is deflected on each deflection reflecting surface at an equiangular speed in a predetermined angular range.

The deflected light flux passes through the first scanning lens 101a and the second scanning lens 102b. The first scanning lens 101a and the second scanning lens 102b have fθ function, cause the light flux deflected at the equiangular speed to scan a surface to be scanned (target surface) 102 at a constant speed, and converge the light flux on the target surface 102 to form a light spot thereon. The scanning direction of the light flux deflected by the optical deflector 103 on the target surface 102 and the direction parallel to this scanning direction are referred to as the main scanning direction, and a plane depicted by the deflected light flux is referred to as the main scanning plane. The direction perpendicular to the main scanning direction and to the main scanning plane is referred to as the sub-scanning direction.

Specific structure of the optical elements is explained below.

The light source 104 emits light beams, and can be formed with a vertical-cavity surface-emitting laser (VCSEL).

The coupling lens 105 has a focal length of 14.5 millimeters (mm) and an effective diameter of 5.6 millimeters, and couples the light beams into substantially parallel light flux.

The linear-image forming lens 107 is a cylindrical lens having power only in the sub-scanning direction. The linear-image forming lens 107 has a focal length of 125 millimeters in the sub-scanning direction, and forms an image of the light flux near the deflection reflecting surface of the optical deflector 103 in the sub-scanning direction.

The aperture 106 restricts the light flux in the main scanning direction and the sub-scanning direction to adjust a beam-spot diameter.

The optical deflector 103 is a tetrahedral mirror with an inscribed circle radius of 7 millimeters, and is made to rotate at a constant speed around the axes parallel to the sub-scanning direction.

The wavelength to be used, i.e., wavelength of the light beams emitted from the light source 104 is 780 nanometers (nm). Its divergence angle (full-width half-maximum) is 28 degrees in the main scanning direction and 8.5 degrees in the sub-scanning direction.

The central (on the optical axis) wall thickness of the first scanning lens 101a is 8 millimeters, and the central wall thickness of a second scanning lens 101b is 3.5 millimeters.

The lateral magnification in the sub-scanning direction of the entire optical system is 2.3 times and that of only the scanning optical system is −0.96 times.

A writing width on the target surface 102 is ±161.5 millimeters.

A target beam-spot diameter on the target surface 102 is 55 micrometers in both the main scanning direction and the sub-scanning direction.

A distance from an exit surface of the first scanning lens (L1) 101a to an entrance surface of the second scanning lens (L2) 101b is 101.87 millimeters, and a distance from an exit surface of the second scanning lens (L2) 101b to the target surface 102 is 141.155 millimeters.

The shape of the optical surface according to the first embodiment is expressed by the following equation (1) and equation (2):

$$x(y) = \frac{C_{m0} \cdot Y^2}{1 + \sqrt{1 - (1 + a_{00}) \cdot C_{m0}^2 \cdot Y^2}} + \quad (1)$$

$$a_{01} \cdot Y + a_{02} \cdot Y^2 + a_{03} \cdot Y^3 + a_{04} \cdot Y^4 + \ldots$$

where X is a coordinate in the optical axis direction (direction parallel to the horizontal axis of FIG. 1A), Y is a coordinate in the main scanning direction (direction parallel to the vertical axis of FIG. 1A), $C_{m0}$ is a curvature of a central line (Y=0) in the main scanning direction and is an inverse number to a curvature radius Rm, and $a_{00}$, $a_{01}$, $a_{02}$, … are aspheric coefficients of a main-scanning shape.

$$C_S(Y) = \frac{1}{R_{S0}} + b_{01} \cdot Y + b_{02} \cdot Y^2 + b_{03} \cdot Y^3 + \ldots \quad (2)$$

where $C_s(Y)$ is a curvature related to Y in the sub-scanning direction, $R_{s0}$ is a curvature on the optical axis in the sub-scanning direction, and $b_{01}$, $b_{02}$, $b_{03}$, … are aspheric coefficients of a sub-scanning shape.

Table 1 shows specific numerical values for items according to the first embodiment.

TABLE 1

| | L1R1 | L1R2 | L2R1 | L2R2 |
|---|---|---|---|---|
| Rm | −1.10143E+02 | −5.79388E+01 | −5.00000E+03 | 7.24165E+02 |
| Rs0 | −4.72788E+02 | −5.00000E+02 | 9.37997E+01 | −6.07124E+01 |
| a00 | 0.00000E+00 | 0.00000E+00 | 0.00000E+00 | 0.00000E+00 |
| a01 | 0.00000E+00 | 0.00000E+00 | 0.00000E+00 | 0.00000E+00 |
| a02 | 0.00000E+00 | 0.00000E+00 | 0.00000E+00 | 0.00000E+00 |
| a03 | 0.00000E+00 | 0.00000E+00 | 0.00000E+00 | 0.00000E+00 |
| a04 | −3.87482E−07 | 1.46716E−07 | 9.47700E−08 | −5.56255E−08 |
| a05 | 0.00000E+00 | 0.00000E+00 | 0.00000E+00 | 0.00000E+00 |
| a06 | 6.88714E−10 | 2.24364E−10 | −7.06271E−12 | 5.42541E−12 |
| a07 | 0.00000E+00 | 0.00000E+00 | 0.00000E+00 | 0.00000E+00 |
| a08 | −3.02912E−13 | −1.24578E−14 | 1.70056E−16 | −6.15064E−16 |
| a09 | 0.00000E+00 | 0.00000E+00 | 0.00000E+00 | 0.00000E+00 |
| a10 | −1.38196E−16 | 5.54989E−18 | −6.11408E−20 | −2.44542E−20 |
| a11 | 0.00000E+00 | 0.00000E+00 | 0.00000E+00 | 0.00000E+00 |
| a12 | 4.97316E−20 | −8.15818E−20 | 3.00776E−24 | 1.76451E−24 |
| a13 | 0.00000E+00 | 0.00000E+00 | 0.00000E+00 | 0.00000E+00 |
| a14 | 0.00000E+00 | 0.00000E+00 | 0.00000E+00 | 0.00000E+00 |
| b01 | 0.00000E+00 | 6.44465E−06 | 4.98759E−07 | 0.00000E+00 |
| b02 | 0.00000E+00 | −2.76702E−06 | −9.40784E−07 | 2.09875E−07 |
| b03 | 0.00000E+00 | −1.17939E−08 | 5.11005E−11 | 0.00000E+00 |
| b04 | 0.00000E+00 | −7.27004E−09 | 7.50683E−11 | 0.00000E+00 |
| b05 | 0.00000E+00 | 3.89316E−11 | −5.15221E−15 | 0.00000E+00 |
| b06 | 0.00000E+00 | −5.12654E−12 | −4.81012E−15 | 0.00000E+00 |
| b07 | 0.00000E+00 | −3.86625E−14 | −1.46189E−19 | 0.00000E+00 |
| b08 | 0.00000E+00 | 1.12285E−14 | 7.21434E−19 | 0.00000E+00 |
| b09 | 0.00000E+00 | 0.00000E+00 | 2.22208E−23 | 0.00000E+00 |
| b10 | 0.00000E+00 | 0.00000E+00 | −2.53749E−23 | 0.00000E+00 |

Figure 2A:
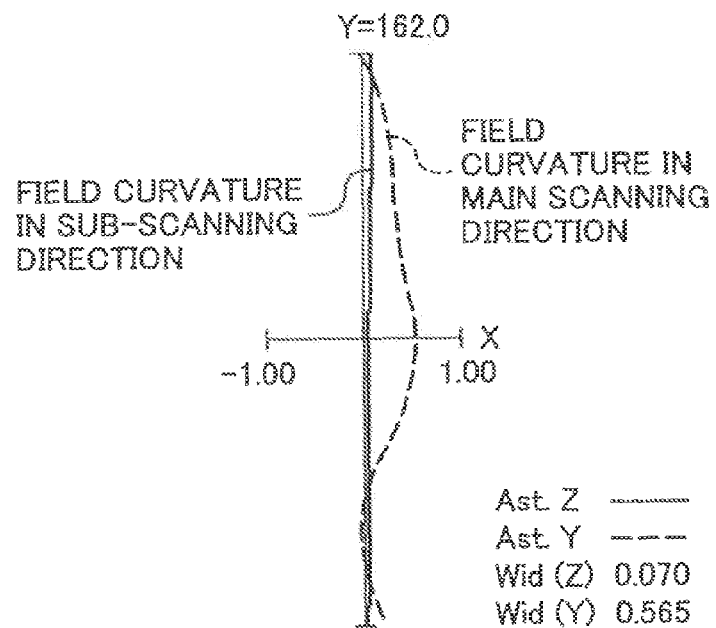
FIG. 2A is a characteristic diagram of a field curvature according to the first embodiment.
Figure 2B:
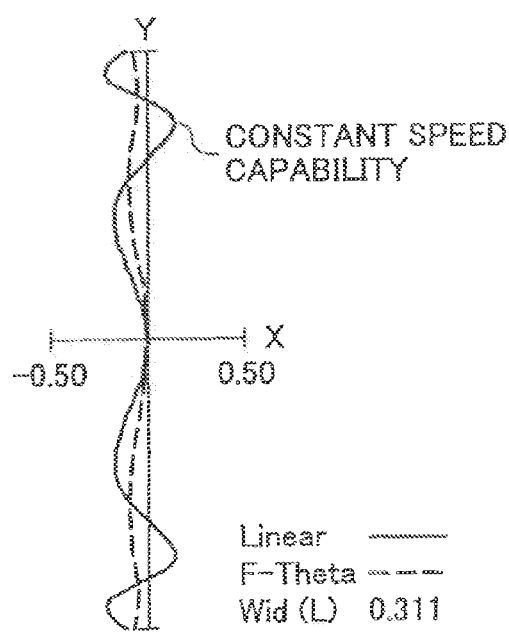
FIG. 2B is a characteristic diagram of constant speed capability according to the first embodiment.
Figure 3:
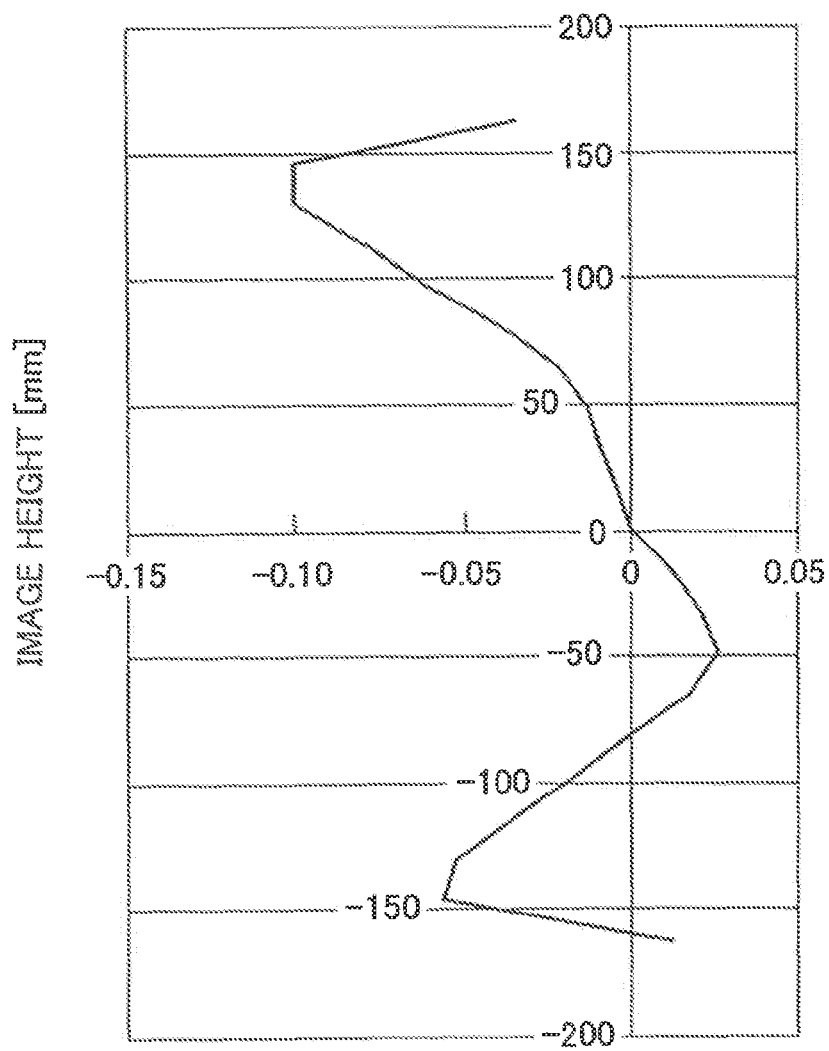
FIG. 3 is a graph of deviation in lateral magnification in the sub-scanning direction according to the first embodiment.
Figure 4A:
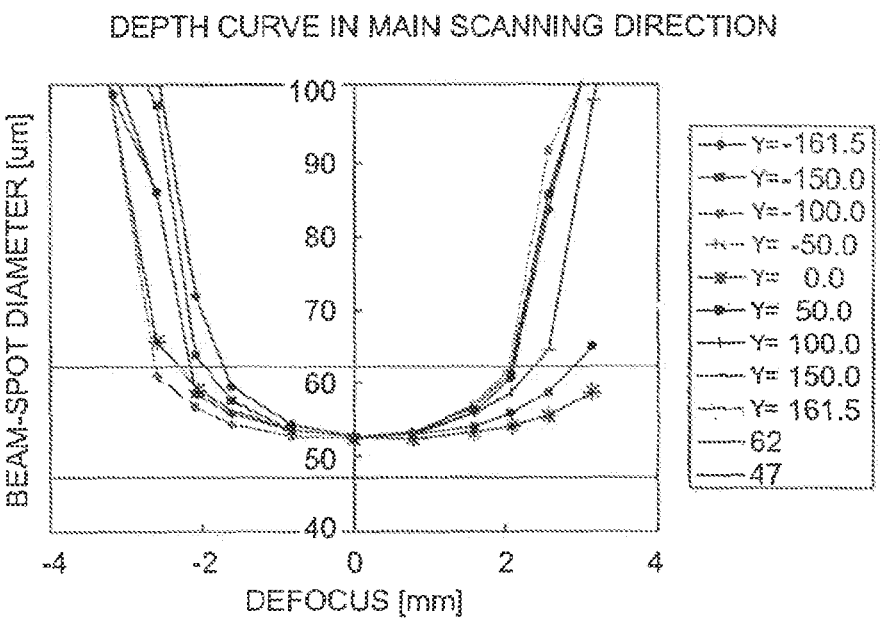
FIG. 4A is a graph of focal depth in the main scanning direction according to the first embodiment.
Figure 4B:
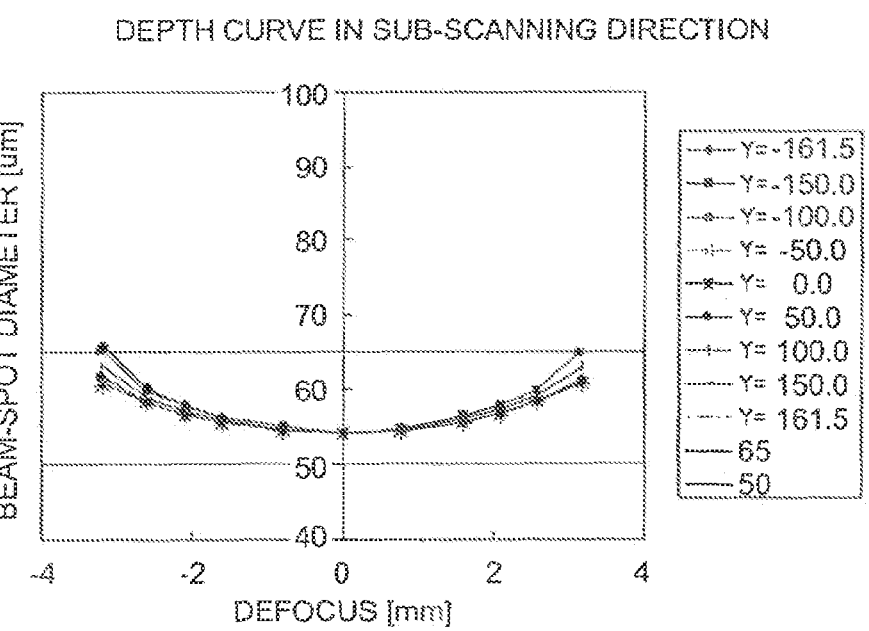
FIG. 4B is a graph of focal depth in the sub-scanning direction according to the first embodiment.

FIGS. 2A and 2B depict field curvatures and constant speed capability, respectively, based on the structure according to the first embodiment. As is clear from FIG. 2A, the image plane is quite smooth in the sub-scanning direction, and the variation of the beam-spot diameter is very small although the wall thickness is reduced as explained above. FIG. 3 depicts deviation in lateral magnification in the sub-scanning direction. As is also clear from FIG. 3, a difference between the lateral magnifications is suppressed to about 0.1%, which is substantially constant. FIGS. 4A and 4B represent plotted beam-spot diameters in the first embodiment. FIG. 4A is a graph of a focal depth curve in the main scanning direction and FIG. 4B is a graph of a focal depth curve in the sub-scanning direction, in which a vertical axis represents the beam-spot diameter (μm).

In FIG. 3, a difference (deviation) Δβ between image heights in the lateral magnification in the sub-scanning direction is about 0.1%, which indicates that the difference is satisfactorily corrected. However, as an appropriate value for cost reduction, the value is desirably 1% or less. For example, with the multibeam scanning device using a plurality of light fluxes of 40 beams, a dot interval based on 2400 dpi is approximately 10.6 micrometers, and thus, 40 beams×10.6 μm=423 μm is simultaneously scanned. If the difference in the magnification is 1%, then the variation of scanning-line interval becomes 4.2 micrometers at maximum, which does not reach even the half of an average value of the scanning-line interval. Accordingly, degradation of image quality is less likely to occur. In an actual case, however, the variation further occurs due to environmental factors and manufacturing errors, which requires suppression of Δβ to be 1% or less to obtain high image quality.

Figure 5:
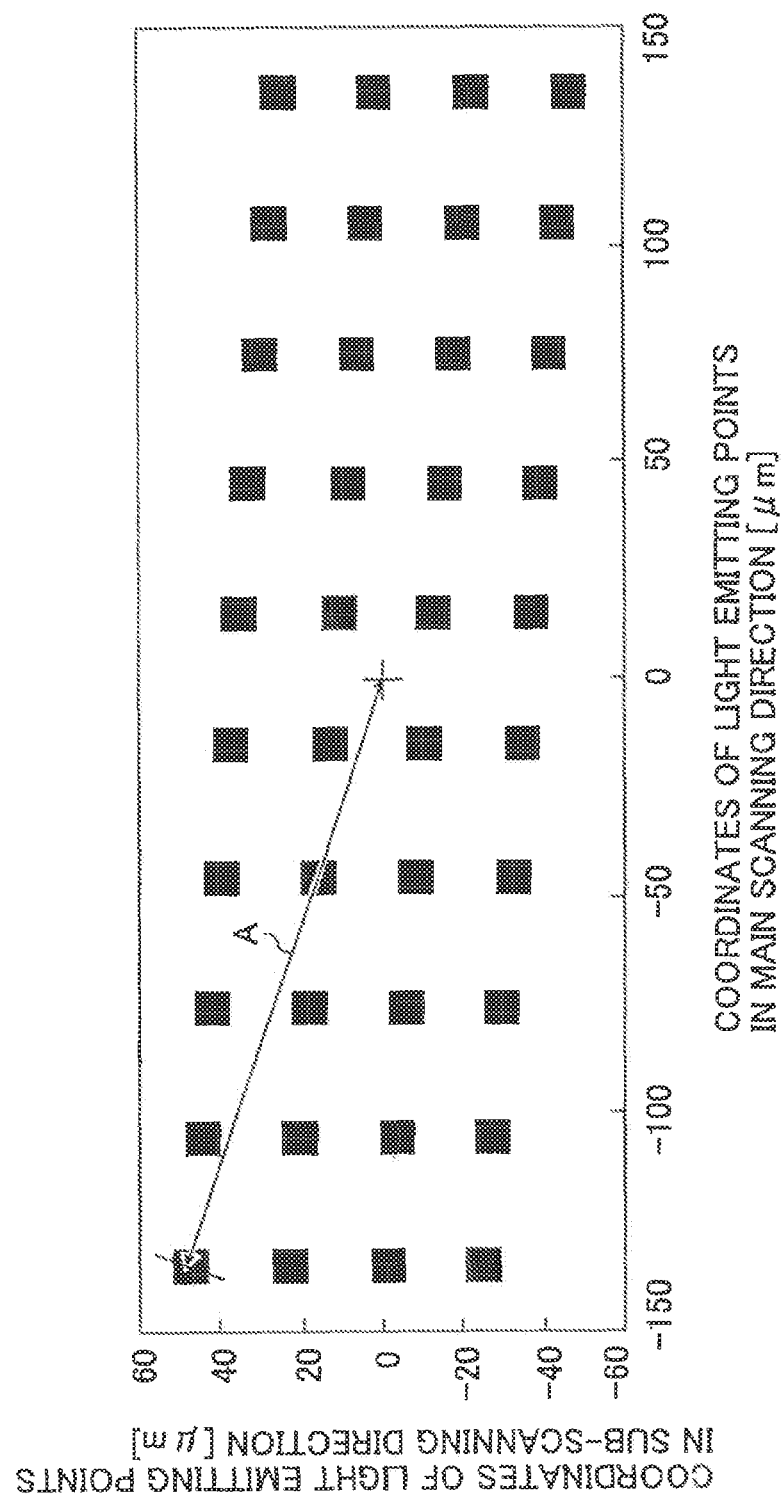
FIG. 5 is a front view of a light source shown in FIG. 1.

The light source 104 is a vertical-cavity surface-emitting laser (VCSEL) having a plurality of light emitting points arranged as shown in FIG. 5. The light emitting points are represented by solid black boxes in FIG. 5. Salient features of the light source 104 are described below. The central wavelength is 780 nanometers, an oxide-confined aperture corresponding to a light emitting spot on the VCSEL is an almost square with each side of 4 micrometers, a divergence angle is 9 degrees in full-width half-maximum, and optical output is 2.5 milliwatts (mW). A total of 40 light-emitting elements are two-dimensionally arranged, and a group of the light-emitting elements has a parallelogram-shaped arrangement area which is long in the main scanning direction. Distances between adjacent light emitting points are 30 micrometers in the main scanning direction and 2.4 micrometers in the sub-scanning direction, and 0 micrometer in the main scanning direction and 24 micrometers in the sub-scanning direction.

The wavelength of emitted light beams is cited by way of example and is not limited to infrared ray of around 780 nanometers. A light source with a generally used wavelength of 655 nanometers or 405 nanometers can also be used. By using the light source with such a short wavelength as above, the focal depth can be increased, which enables the allowable error range in a manufacturing process to be widely set. Furthermore, the beam-spot diameter can be reduced, which enables optical scanning and image formation with high resolution.

In the example of the light source shown in FIG. 5, the origin coincides with the optical axis. A light emitting point most distant from the optical axis is at coordinates (135 μm, 46.8 μm), and a distance A from the optical axis is 0.143 millimeter. According to the specification, F=14.5 mm, θ=28°, and D=2.8 mm. Therefore, the condition as follows is satisfied:

$$F \tan(\theta/2) + A < D/0.7$$

This conditional expression indicates that an effective diameter of a coupling optical element requires a predetermined size with respect to the light flux. More specifically, if the effective diameter is equivalent to or less than the light flux, then this causes light-use efficiency to decrease, and also the light flux is easily diffracted. If the effective diameter is increased to the size in which the diffraction does not occur, then the optical element is upsized, and thus the device cannot be downsized.

Figure 6:
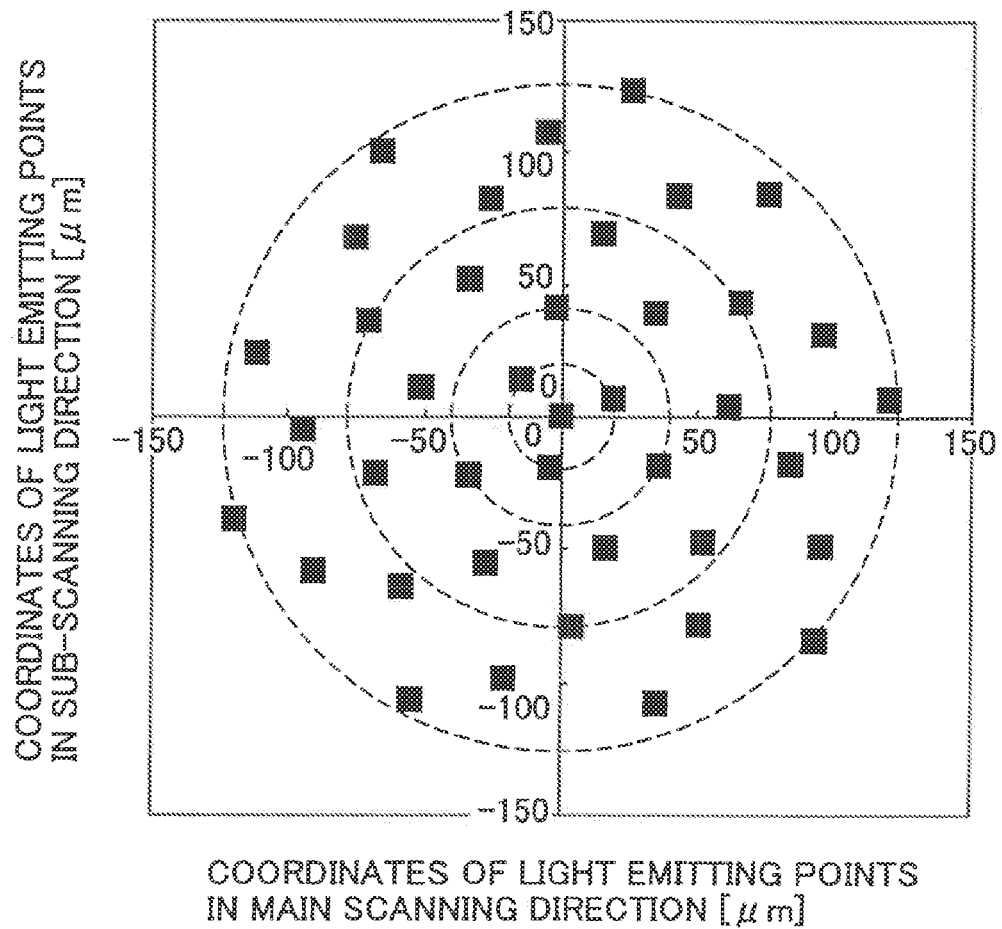
FIG. 6 is a front view of a light source used in an optical scanning device according to a second embodiment of the present invention.

A second embodiment of the present invention is described below. An optical scanning device according to the second embodiment is basically similar to that of the first embodiment except for a structure of the light source 104. FIG. 6 represents an arrangement of the light emitting points in the light source 104. In the second embodiment, the light emitting points are arranged in such a manner that 13 circular rings each passing through three light emitting points are concentrically arranged. With this arrangement, the light emitting points are made dense and close to the optical axis, and thus even the farthest light fluxes outside the axis can sufficiently hold their optical characteristics. Although there are three light emitting points on one circular ring in the second embodiment, four, six, or any other number of light emitting points can be on one circular ring.

Figure 7:
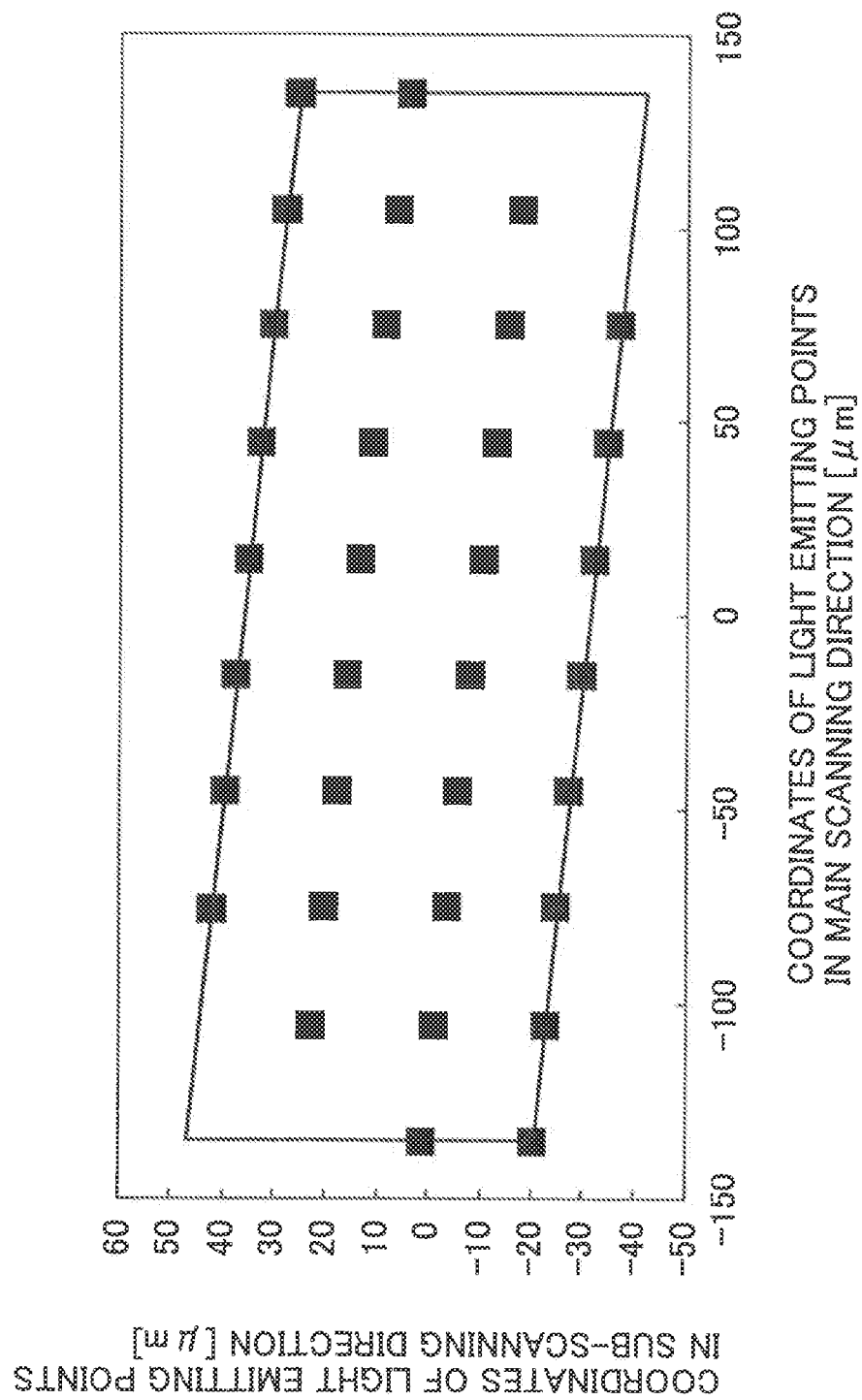
FIG. 7 is a front view of a light source used in an optical scanning device according to a third embodiment of the present invention.

A third embodiment of the present invention is described below. An optical scanning device according to the third embodiment is basically similar to that of the first embodiment except for a structure of the light source 104. FIG. 7 represents an arrangement of the light emitting points in the light source 104. In the third embodiment, the light emitting points are arranged to be surrounded by a parallelogram, in which there is no light emitting point that helps optical scanning at least near each vertex of acute angles among the vertexes of the parallelogram having the minimum area to surround the light emitting points. Alternatively, even if there is a light-emitting element near the vertex of the acute angle, the light emitting point does not help optical scanning.

Figure 8A:
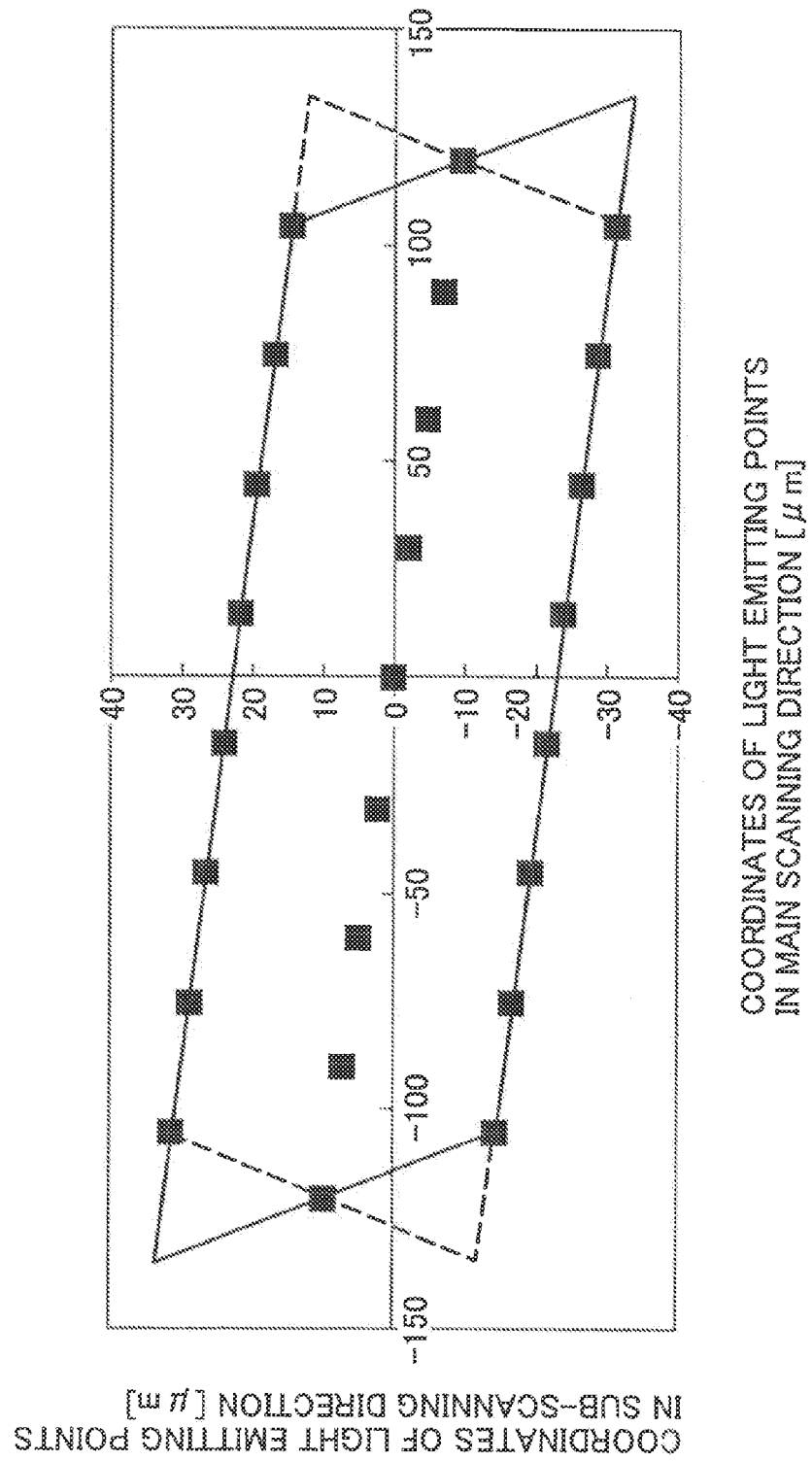
FIGS. 8A and 8B are front views of a light source used in an optical scanning device according to a modification of the third embodiment.
Figure 8B:
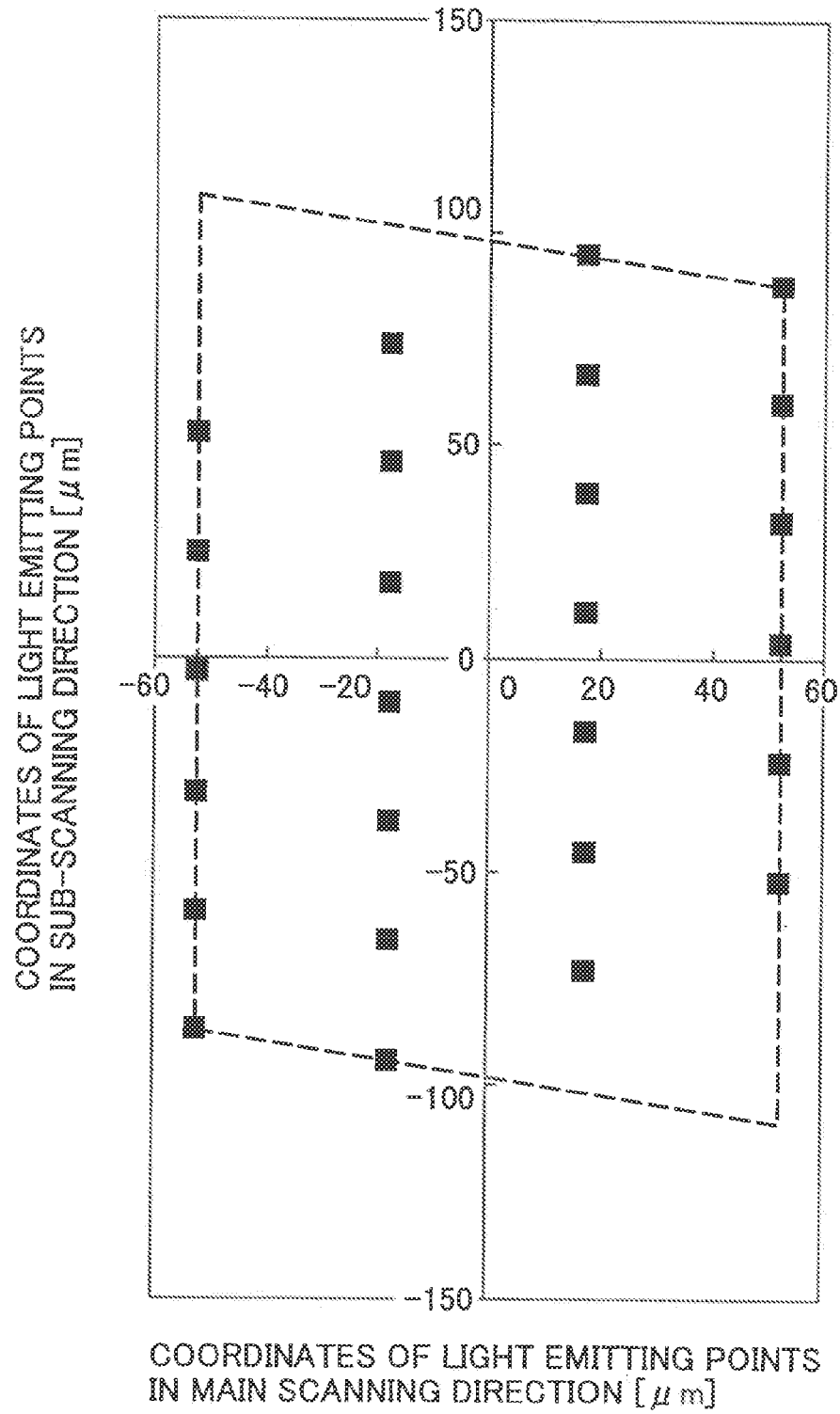

FIGS. 8A and 8B represent modifications of the third embodiment. In FIG. 8A, the parallelograms each having the minimum area are indicated by the solid line and the dotted line, respectively. However, in both cases, there is no light emitting point at each acute angle of the two parallelograms. In this manner, the light emitting points helping the optical scanning are not provided near locations of the vertexes of the acute angles, among the vertexes of the parallelogram, i.e., locations arranged farthest from the optical axis. Therefore, the light beams such that intervals between scanning lines easily vary can be removed, and thus satisfactory optical scanning can be performed with any ones of the light fluxes. The light emitting point to be removed may be one point on each acute angle of the parallelogram (see FIG. 8A), or a plurality of points around each acute angle may be removed (see FIGS. 7 and 8B). The parallelogram surrounding the light emitting points may be one being long in the main scanning direction as shown in FIG. 8A, or may be one being long in the sub-scanning direction as shown in FIG. 8B.

Figure 9:
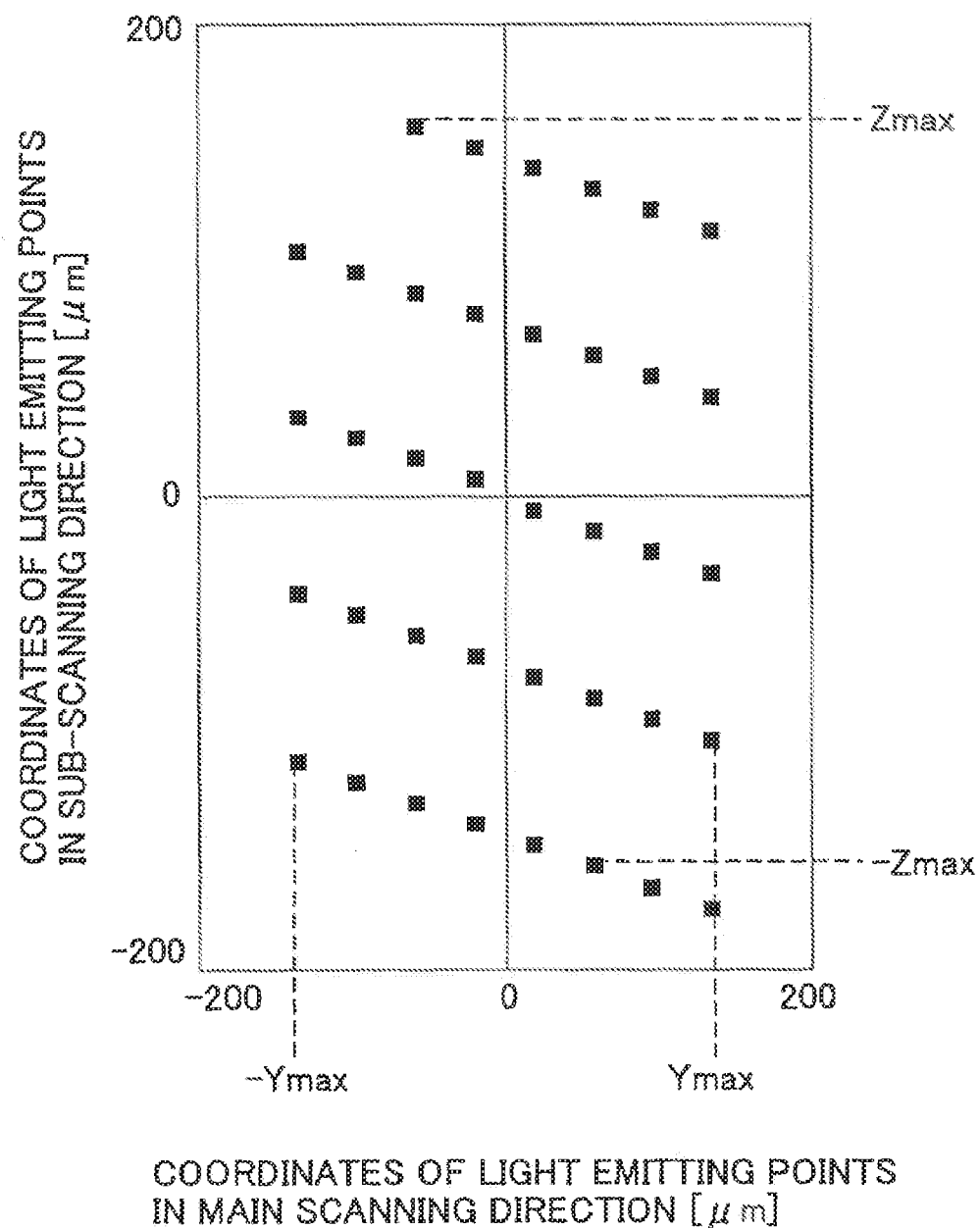
FIG. 9 is a front view of a light source used in an optical scanning device according to another modification of the third embodiment.

FIG. 9 represents another modification of the third embodiment. In this modification also, a plurality of light emitting points in the light source is arranged in an area surrounded by a parallelogram, and there is also no light emitting point helping optical scanning near at least the vertexes of acute angles among vertexes of the minimum parallelogram surrounding the light emitting points. In FIG. 9, Ymax and Zmax indicate coordinates of the light emitting points located at the outermost edges of a range in the main scanning direction and the sub-scanning direction, respectively, based on the center of the range where the light emitting points are arranged being determined as an origin. If a range "a" in the main scanning direction where the light emitting points in the light source are arranged is $$a = 2Y_{max},$$

and if a range "b" in the sub-scanning direction where the light emitting points in the light source are arranged is $$b = 2Z_{max},$$

then the light emitting points are arranged to satisfy the following condition:

$$0.6 \leq a/b \leq 1.4.$$

More specifically, the condition indicates that the light emitting points are desirably set at positions around and near a square indicated by the ratio between "a" and "b" being 1, or the ratio of the main scanning direction as "a" to the sub-scanning direction as "b". However, reduction of the range where they are arranged is limited, allowing for mutual thermal interference between the light emitting points and arrangement pattern. If the reduction of the range exceeds the lower limit of the conditional expression, or if the range is prolonged in the sub-scanning direction, then the light emitting points spread in the sub-scanning direction. This spread causes an error in intervals between the beam spots in the sub-scanning direction to increase, and density variation due to nonuniform formation of the scanning lines becomes visible. This density variation causes degradation of the image quality as banding.

If the reduction exceeds the upper limit of the conditional expression, or if the range is prolonged in the main scanning direction, then "eclipse" of light flux easily occurs on the deflector, and the beam-spot diameter is degraded. By satisfying the conditional expression when the light source that generates a plurality of light fluxes is used, it is possible to prevent degradation of the optical characteristics such as increase of the field curvature and the beam-spot diameter and reduction of light amount of the light flux outside the axis.

Figure 10:
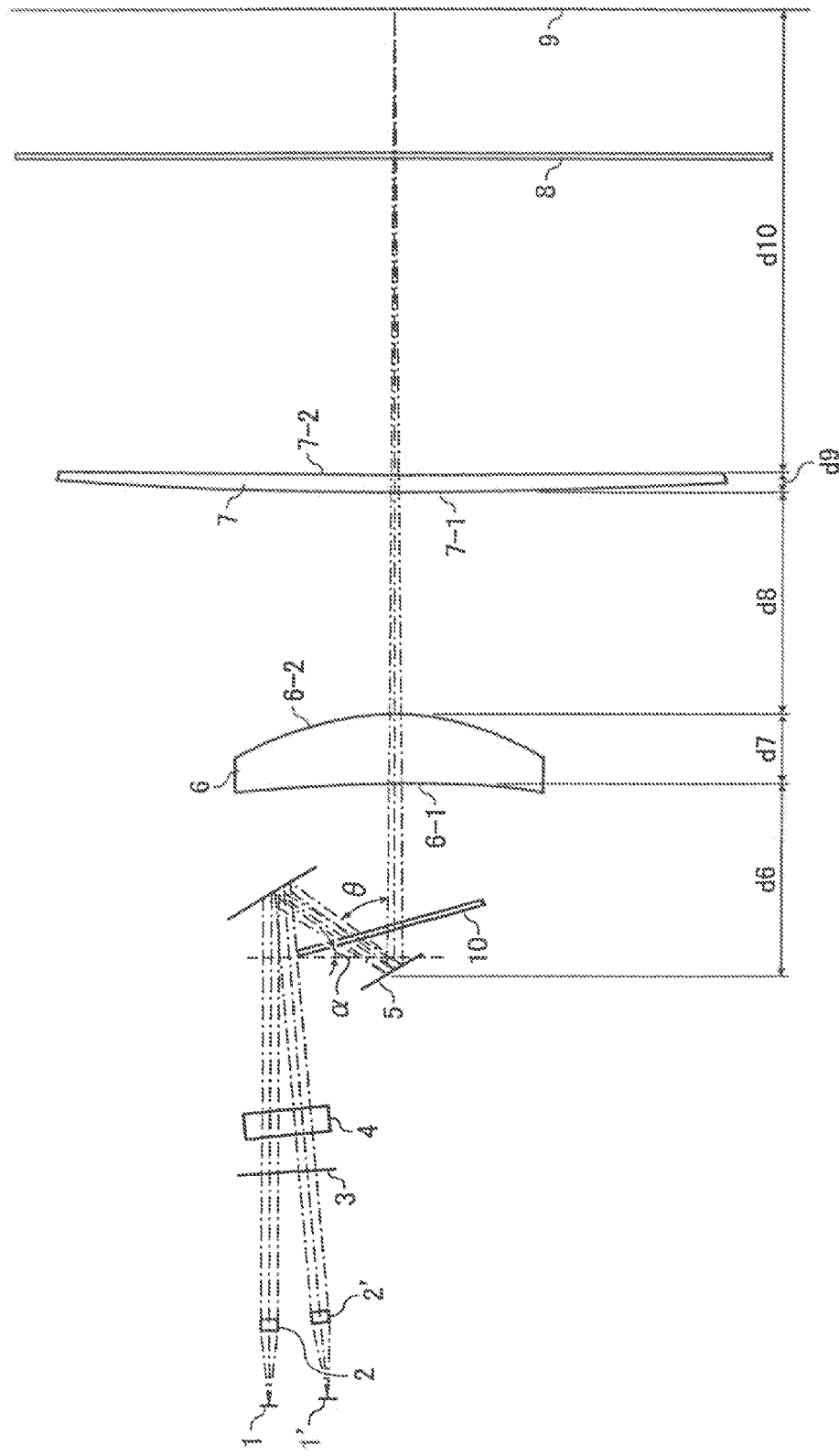
FIG. 10 is a plan view of an optical scanning device according to a fourth embodiment of the present invention in the main scanning direction.

FIG. 10 represents an optical scanning device according to a fourth embodiment of the present invention. The optical scanning device includes light sources 1 and 1', coupling lenses 2 and 2', an aperture 3, a linear-image forming element as an anamorphic optical element 4, an optical deflector 5, a first scanning lens 6, a second scanning lens 7, a dustproof glass 8, a target surface 9, and a soundproof glass 10. Data for the glass material (glass 1) and resin material (resin) used for the optical elements of the fourth embodiment are shown in Table 2.

TABLE 2

|  | Median | Wavelength hopping | Temperature variation | Linear expansion coefficient |
|---|---|---|---|---|
| Glass 1 | 1.515141 | 1.515116 | 1.515062 | $7.5 \times 10^{-6}$ |
| Resin | 1.527257 | 1.527229 | 1.525368 | $7.0 \times 10^{-5}$ |

In Table 2, "median" is a refractive index for a wavelength to be used at a reference temperature of 25° C., "wavelength hopping" is a refractive index when wavelength hopping occurs caused by mode hopping, and "temperature variation" is a refractive index when the temperature rises 20 degrees from the reference temperature. For the "wavelength hopping" due to mode hopping, it is assumed that a wavelength change is 0.8 nanometer (nm), allowing for an unexpected change.

Data for an optical system located downstream of the optical deflector 5 is shown in Table 3.

TABLE 3

|  | $R_m$ | $R_s$ | $D_X$ | $D_Y$ | n |
|---|---|---|---|---|---|
| Optical deflector (Rotating axis) | — | — | 43.3 | 2.9 | — |
| Scanning lens 6-1 | −110.142 | −472.788 | 8 | 0 | Resin |
| Scanning lens 6-2 | −57.939 | −500. | 101.1 | | |

TABLE 3-continued

|  | $R_m$ | $R_s$ | $D_X$ | $D_Y$ | n |
|---|---|---|---|---|---|
| lens 6-2 Scanning lens 7-1 | −5000. | 93.8 | 3 | 0 | Resin |
| Scanning lens 7-2 | 724.16 | −60.71 | 139.9 | | |
| Surface to be scanned | — | — | — | — | — |

In Table 3, $R_m$ represents a paraxial curvature in the main scanning direction, $R_s$ represents a paraxial curvature in the sub-scanning direction, $D_x$ and $D_y$ represent a relative distance from an origin of each optical element to an origin of a next optical element, and n represents a material to be used. Unit is millimeter (mm). For example, referring to $D_x$ and $D_y$, with respect to the optical deflector 5, when viewed from the rotational axis of the polygon mirror as the optical deflector 5, the origin of the entrance surface of the first scanning lens 6 (position of the optical axis on the surface of its entrance side) is 43.3 millimeters (distance indicated by d6 in FIG. 10) away from the optical deflector 5 in the optical axis direction (x direction, horizontal direction in FIG. 10), and is 2.9 millimeters away therefrom in the main scanning direction (y direction, vertical direction in FIG. 10). The dustproof glass 8 made of glass 1 with a thickness of 1.9 millimeters is arranged between the second scanning lens 7 and the target surface 9, as shown in FIG. 10. In Table 3, scanning lenses 6-1 and 6-2 represent entrance and exit surfaces of the first scanning lens 6, respectively, and scanning lenses 7-1 and 7-2 represent entrance and exit surfaces of the second scanning lens 7, respectively.

The surfaces of the scanning lenses 6 and 7 are aspheric surfaces, which are specific surfaces, both of which are non-circular arcs given by equation (1) in the main scanning direction, and in which the curvature in the sub-scanning cross section (virtual cross section parallel to the optical axis and the sub-scanning direction) changes according to equation (2) in the main scanning direction.

Coefficients of the entrance surface (specific surface) of the first scanning lens 6 are given in L1R1 of Table 1.

Coefficients of the exit surface (specific surface) of the first scanning lens 6 are given in L1R2 of Table 1.

Coefficients of the entrance surface (specific surface) of the second scanning lens 7 are given in L2R1 of Table 1.

Coefficients of the exit surface (specific surface) of the second scanning lens 7 are given in L2R2 of Table 1.

The elements of the optical system are described below. It is noted that the optical elements located upstream of the optical deflector in the optical system are appropriately arranged so that positions of image formation in the main scanning direction and sub-scanning direction of the entire optical system are near a surface to be scanned.

Light Source

The light source 1 (1') is a semiconductor laser with a light emission wavelength of 655 nanometers in design. If the temperature rises 1° C. from a reference temperature of 25° C., then the light emission wavelength shifts to the long wavelength side by 0.20 nanometer. As for the mode hopping, as explained above, it is assumed that the wavelength change is 0.8 nanometer. In the fourth embodiment, as shown in FIG. 10, two semiconductor lasers each having one light emitting point are provided. However, a semiconductor laser array or a VCSEL array can also be used.

Coupling Lens

The coupling lens 2 (2') is a glass lens as explained above, and is disposed so that the lens has a focal length of 15 millimeters and has a function of converting the light beam to substantially parallel light beam. The aspheric surface is used for both surfaces of the coupling lens 2 (2'), so that the aspheric surfaces satisfactorily correct the wavefront aberration of coupled light beam although aspheric coefficients are not disclosed.

The semiconductor laser 1 (1') and the coupling lens 2 (2') are fixedly held by a holding element made of a material having a linear expansion coefficient of $2.3 \times 10^{-5}$.

The coupling lens 2 (2') is made of glass, and has the refractive indexes shown in Table 1.

Aperture

The aperture 3 is a rectangular aperture with a diameter in the main scanning direction of 5.4 millimeters and a diameter in the sub-scanning direction of 2.28 millimeters, and shapes the light beams coupled by the coupling lens 2 and 2'. In FIG. 10, a shielding element (not shown) is arranged between the light sources 1, 1' and the coupling lenses 2, 2', and another shielding element (not shown) is arranged between the anamorphic optical element 4 and the optical deflector 5.

Anamorphic Optical Element

The anamorphic optical element 4 which is the linear-image forming unit is obtained by forming its entrance surface with a cylindrical surface having the power only in the sub-scanning direction and forming its exit surface with a step-shaped diffractive surface having elliptical diffraction grooves. A curvature radius of the entrance surface in the sub-scanning direction is 63.4 millimeters. An exit surface (second surface) is a diffractive surface, and a phase function $\phi(y, z)$ of the diffractive surface is expressed by the following equation:

$$\phi(y, z) = C1 \cdot Y^2 + C2 \cdot Z^2$$

$$C1 = -0.0006199, C2 = -0.007537$$

The diffractive surface is formed into a toroidal surface having a curvature radius in the main scanning direction of 425.4 millimeters and a curvature radius in the sub-scanning direction of 35 millimeters, where the step-shaped diffractive surface having elliptical diffraction grooves is formed.

In this case, in the main scanning direction,
Power P1 of the diffractive portion The power is converted from the coefficient of the phase function, and a converted curvature radius is $$R' = (n-1)/(2 \times C1) = -425.4,$$

power P1=1/f in this case,

1/f=(n−1)/R'=−0.001240 (based on refractive index n=1.527257).
Power P2 of the refractive portion $$P2 = 1/f = (n-1)/R = 0.001232.$$

Power P3 of a surface which is not the diffractive portion

Because the entrance surface is the cylindrical surface having the power only in the sub-scanning direction,

P3=0.

Similarly to the above case, in the sub-scanning direction,
Power P1 of the diffractive portion $$R' = (n-1)/(2 \times C2) = -35,$$

$$P1 = 1/f = (n-1)/R' = -0.015074.$$

Power P2 of the refractive portion $$P2 = 1/f = (n-1)/R = 0.014970.$$

Power P3 of a surface which is not the diffractive portion $P3 = 1/f = (n-1)/R \cdot$, because R is 63.4 millimeters,

P3=0.008316.

Therefore, as the shape of the diffractive surface in the sub-scanning direction, all the following three conditional expressions are satisfied:

$$|P3| \geq |P1+P2|, \quad (1)$$

$$|P1| > |P1+P2| \text{ and } |P2| > |P1+P2|, \quad (2)$$

and $$P1 \times P3 > 0 \quad (3)$$

By setting the conditions as above, accuracy of the machining can easily be obtained, degradation of the optical performance due to temperature variation can be corrected, and the optical element can be one highly resistant to decentering between the surfaces. At this time, P1≈P2 in both the main scanning direction and the sub-scanning direction, and the shape of the finished diffractive surface is close not to a blade shape but to a step shape (to a multi-step type shown in FIG. 11). In other words, the second surface has no power in both the main scanning direction and the sub-scanning direction.

Optical Deflector

The optical deflector 5 is a polygon mirror having four reflecting surfaces with an inscribed circle radius of 7 millimeters.

The soundproof glass 10 is made of the glass 1, has a thickness of 1.9 millimeters, and a tilt angle α thereof from the y direction (vertical direction of FIG. 10) is 16 degrees.

An angle θ is 60.55 degrees. More specifically, the angle is formed by a traveling direction of the light beam incident from the light source side and by a traveling direction of the light beam reflected on the deflection reflecting surface of the optical deflector 5 toward a position where an image height on the target surface 9 is 0.

Changes in the beam waist positions in the main and sub-scanning directions according to the fourth embodiment are as shown in Table 4.

TABLE 4

|  | Wavelength hopping | Temperature variation |
|---|---|---|
| Main scanning direction | 0.11 mm | 0.04 mm |
| Sub-scanning direction | 0.18 mm | 0.16 mm |

It is obvious that the changes in the beam waist positions are respectively reduced by the effect of the diffractive surface.

Figure 11:
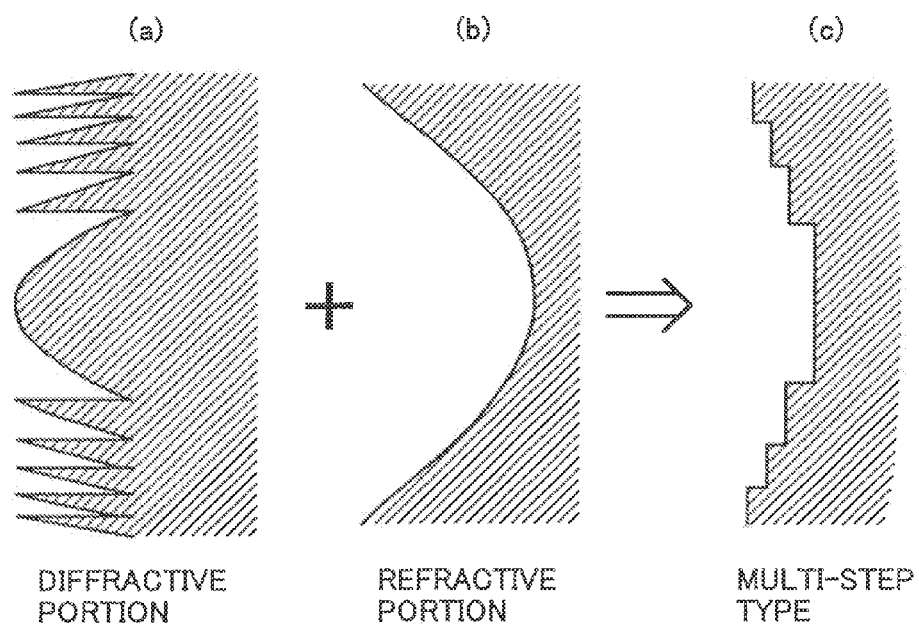
FIG. 11 is an example of how to form a multi-step type diffractive optical surface.
Figure 12A:
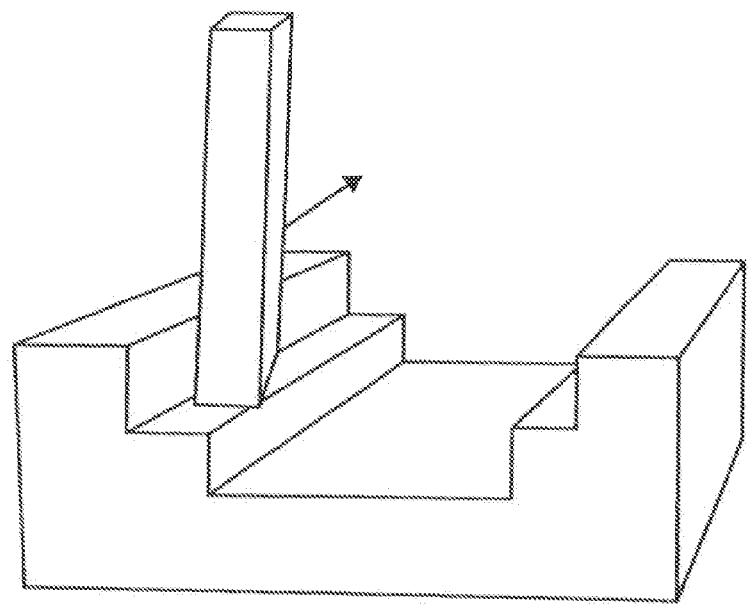
FIGS. 12A and 12B are perspective views of the multi-step type diffractive optical surface.
Figure 12B:
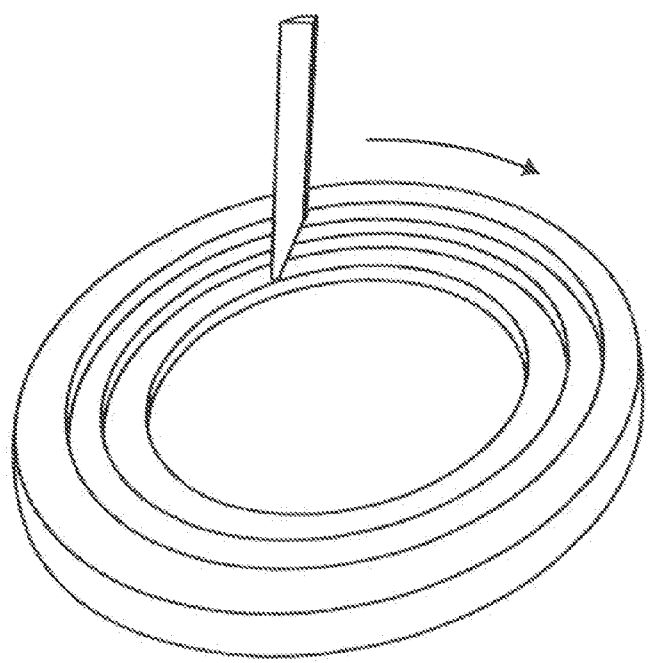

It is desirable that the power is almost zero by forming the shape of the diffractive optical surface into a "multi-step type" having a step-shaped structure as shown in (c) of FIG. 11 and FIGS. 12A and 12B. The multi-step type is a shape obtained by a combination of a diffractive portion shown in (a) of FIG. 11 and a refractive portion shown in (b) of FIG. 11. As shown in (c) of FIG. 11, when viewed from its cross section, the surface has a step structure. If the surface is formed with flat portions in this manner, then machining for the rotating surface as shown in FIG. 12B is easier as compared with machining for a linearly machined plane as shown in FIG. 12A, and manufacturing error can thereby be reduced.

An image forming apparatus or a full-color image forming apparatus that forms a color image by superimposing images of a plurality of color components one on top of another can be configured with the optical scanning device. The image forming apparatus can form an image by electrophotographic processes, and includes the optical scanning device according to any one of the embodiments as a device for performing an exposure process of the electrophotographic processes. The image forming apparatus can be configured with a plurality of image forming stations for color components capable of forming images through the electrophotographic processes. By superimposing the images formed at the image forming stations one on top of another, the image forming apparatus enables full-color image formation.

Figure 13:
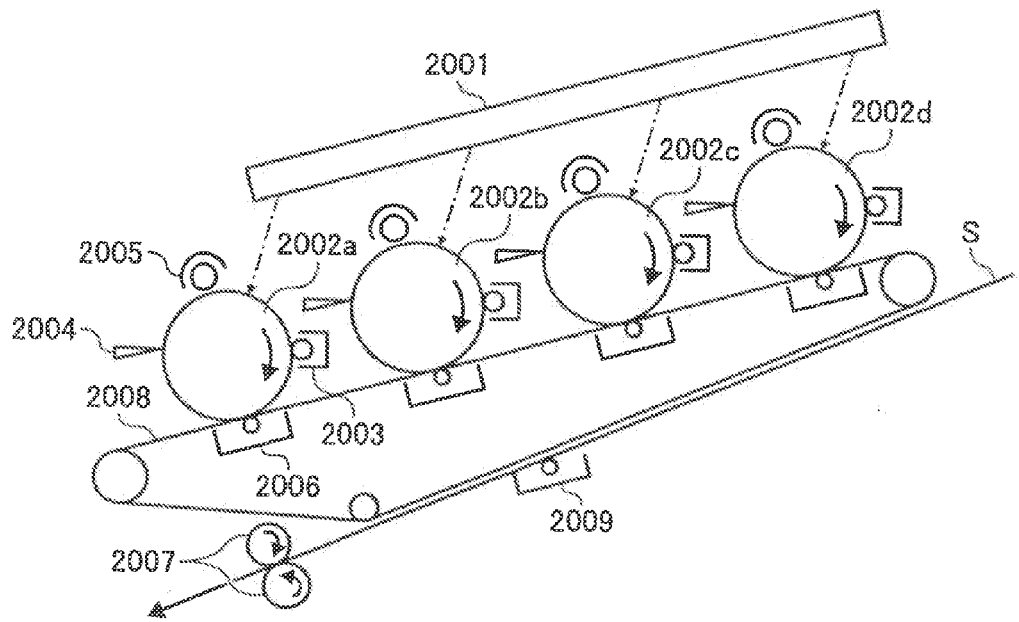
FIG. 13 is a front view of an image forming apparatus according to a fifth embodiment of the present invention.

FIG. 13 represents a full-color image forming apparatus according to a fifth embodiment of the present invention. This image forming apparatus can form images of a plurality of colors by scanning and exposing a plurality of surfaces, visualizing images of the colors thereon, and superimposing the images on top of another. In FIG. 13, the image forming apparatus includes an optical scanning device 2001, a photosensitive element 2002 (2002a to 2002d), a developing device 2003, a cleaning unit 2004, a charging unit 2005, a transfer unit 2006, a fixing unit 2007, an intermediate transfer belt 2008, a transfer unit 2009, and a sheet-type recording medium S. It is noted that the reference numerals 2003, 2004, 2005, and 2006 indicate representatives of the corresponding components, respectively.

The image forming stations includes the photoconductive and photosensitive elements 2002a to 2002d, respectively, which rotate clockwise at constant speed as indicated by arrows in FIG. 13. Each charging unit 2005 uniformly charges each surface of the photosensitive elements 2002a to 2002d, and the optical scanning device 2001 exposes and scans the surfaces of the photosensitive elements 2002a to 2002d with image signals corresponding to the color components. In other words, the surfaces of the photosensitive elements 2002a to 2002d are surfaces to be scanned. The exposure causes electrostatic latent images to be written on the surfaces of the photosensitive elements 2002a to 2002d, respectively. Each developing unit 2003 supplies toner of corresponding color component to each surface of the photosensitive elements 2002a to 2002d to visualize the electrostatic latent images as toner images of the respective color components.

The visualized toner images are sequentially transferred by each transfer unit 2006 to the intermediate transfer belt 2008, and the color images are superimposed one on top of another to form one full color image. The full color image is transferred to the sheet-type recording medium S by another transfer unit 2009, and the full color image on the sheet S is fixed by a fixing unit 2007 to complete image formation, and the sheet S is ejected to the outside. The cleaning unit 2004 cleans each of the photosensitive elements 2002a to 2002d to remove residual toner which has not been transferred and paper dust from each of them. Thereafter, each of the photosensitive elements 2002a to 2002d is charged again by the charging unit 2005.

The colors corresponding to the photosensitive elements 2002a to 2002d are cyan C, magenta M, yellow Y, and black Bk, and the order of the colors can be CMYBk or YMBkC. That is, the colors can be freely selected for optimization. For example, there are an optical scanning device used in a position where scanning quality is difficult to be improved and an optical scanning device used for a photosensitive element in which the process of adjustment is desirably reduced. For one of these optical scanning devices, a corresponding color is desirably selected according to the degree of lightness or the degree of visibility.

For example, for a photosensitive element corresponding to an optical system with worst optical characteristics (large field curvature, large bending of scanning line, etc.), Y is desirably used because of its low visibility or high lightness. The sizes of the photosensitive elements in the embodiments are the same as one another. However, by increasing the size of the photosensitive element corresponding to Bk, one with the highest use frequency is set so as to achieve high durability, and thus stability of the entire apparatus can also be improved.

Figure 14:
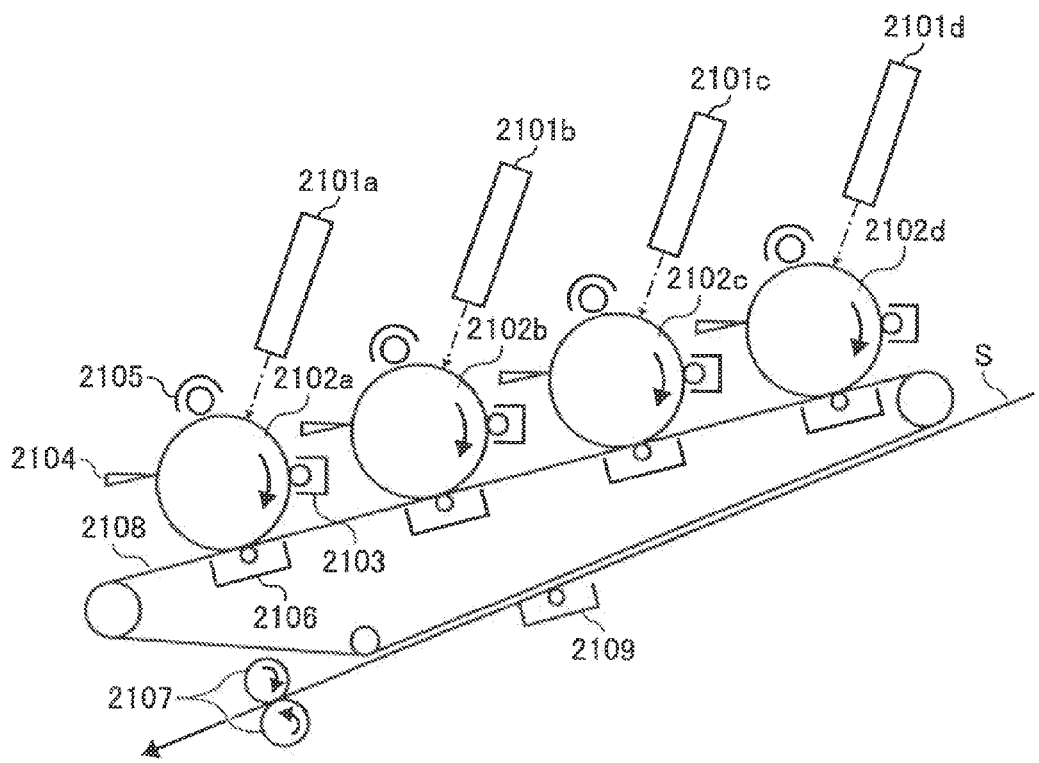
FIG. 14 is a front view of an image forming apparatus according to a modification of the fifth embodiment.

FIG. 14 represents a modification of the image forming apparatus according to the fifth embodiment. The modification is different from the fifth embodiment shown in FIG. 13 in that optical scanning devices which expose photosensitive elements are provided in one-to-one correspondence with the photosensitive elements. As shown in FIG. 14, the image forming apparatus includes an optical scanning device 2101 (2101a to 2101d), a photosensitive element 2102 (2102a to 2102d), a developing device 2103, a cleaning unit 2104, a charging unit 2105, a transfer unit 2106, a fixing unit 2107, an intermediate transfer belt 2108, a transfer unit 2109, and a sheet-type recording medium S. It is noted that the reference numerals 2103, 2104, 2105, and 2106 indicate representatives of the corresponding components, respectively. As shown in the modification, by employing the system of using a plurality of optical scanning devices, the entire optical scanning device can be minimized, thus improving the manufacturing yield.

As set forth hereinabove, according to an embodiment of the present invention, by using a light source with light emitting points arranged in such a manner that the maximum value is A or less in the conditional expression: $F \tan(\theta/2) + A < D/0.7$, light beams reaching the periphery of a coupling optical element can be reduced. This reduction can prevent degradation of optical characteristics. The optical element such as a lens has characteristics such that even if only the radius of the effective range (effective diameter) D is ensured for an optical surface, accuracy in machining capability decreases in its periphery. Therefore, it is desirable that A is set in a range which satisfies the conditional expression for using up to 70% of the side close to the optical axis of the effective diameter. If the effective diameter of the optical element is equivalent to or less than that of a light flux, then the light-use efficiency is reduced and the light flux may easily cause unintended diffraction.

A diffracted light having occurred in this manner becomes stray light in the optical scanning device and becomes ghost when reaching the image plane, which causes image degradation. If the effective diameter of the optical element is increased up to a size with which the diffraction does not occur, the size of the optical element increases, which it is an obstacle to miniaturization of the device. By setting the effective diameter D of the optical element to a value of the lower limit of the conditional expression, it is possible to prevent upsizing of the device and cost increase without increasing the size of the optical element more than necessary.

For the light source having a plurality of light emitting points, as in conventional technologies (e.g., Japanese Patent Application Laid-Open No. 2004-287292), if the light emitting points are arranged in a matrix in the vertical direction and the horizontal direction, the form of the arrangement becomes a quadrangle such as a parallelogram. The accumulation efficiency of the light emitting points in this arrangement is lower than that of an arrangement in which light emitting points are accumulated based on a circle. Light emitting points near vertexes of the quadrangle are inevitably far from the optical axis, and therefore, degradation of the optical characteristics of light beams emitted from the light emitting points near the vertexes is unavoidable.

As explained above, according to an embodiment of the present invention, a plurality of circular rings are concentrically provided, on each of which at least three light emitting points are located, and all the light emitting points are arranged on the concentric circular rings. This arrangement improves an accumulation rate of the light emitting points and reduction of the degradation of the optical characteristics even if the light fluxes are outside the axis. Moreover, the increase of the accumulation rate enables intervals between the light emitting points to be widened. Therefore, the influence of thermal crosstalk can be reduced and laser oscillation with stable light amount can be achieved. Thus, satisfactory multibeam optical scanning can be performed.

The arrangement of the light emitting points in the matrix within the area surrounded by the parallelogram allows a simple structure of the light source. Therefore, the advantage of this arrangement is to enable simplification of manufacturing equipment and to enable simplification of testing conducted thereon, resulting in achievement of cost reduction.

However, the optical characteristics deteriorate as the light emitting point is more away from the optical axis. Particularly, the case where the light emitting points are arranged in the parallelogram causes problems. The light emitting points at vertexes of acute angles, which are located farthest from each other in both the main scanning direction and the sub-scanning direction, become those which are mutually adjacent to each other in the sub-scanning direction after a plurality of times of scanning is performed. If there is a variation in intervals between scanning lines in the sub-scanning direction due to a difference in optical characteristics between the light emitting points, the characteristic of the optical scanning in this portion degrades. In this case, if an image is formed, problems such as uneven density and color shift may occur.

According to an embodiment of the present invention, some light emitting points as explained below are not used for optical scanning. That is, the light emitting points not used for optical scanning are those arranged near the vertexes of the acute angles among the vertexes of the parallelogram, or arranged near the positions farthest from the optical axis. Therefore, light beams with which intervals between scanning lines easily vary can be removed, and thus, excellent optical scanning can be performed with any ones of light fluxes. The light emitting point to be removed can be one on the vertex of an acute angle or one nearest to the vertex of an acute angle, or can be a plurality of ones around the vertex.

The light emitting points are arranged in a range similar to a square or a circle. Therefore, the arrangement density of the light emitting points can be enhanced, and light beams can be made close to the optical axis. Thus, degradation of the optical characteristics can be prevented.

As described in Japanese Patent Application Laid-Open No. 2004-126192, by combining diffractive optical effect and refractive effect, the change of a beam waist position (focus position) due to temperature change can be reduced. However, if a resin lens using the aspheric surface for the scanning lens is used, problems arise when the temperature of the optical scanning device increases due to heat generated by rotation of a polygon scanner or due to heat generated by fixing unit in the image forming apparatus. The problems include (1) increase of a wavelength of the light flux emitted from the light source (the wavelength is lengthened), (2) decrease of a refractive index of the lens, and (3) expansion of the lens.

If the ordinary refractive surface is used, the three variations cause the beam waist position to change in the direction away from the deflector (positive direction in this case). However, the diffractive surface changes in such a manner that the focal length becomes shorter if the wavelength becomes longer, and changes in a direction in which the focal length becomes shorter when the temperature arises (negative direction in this case). Thus, the variation due to the refractive surface and the variation due to the temperature rise cancel out each other, and the variation of the focal length upon temperature variation can be totally reduced. When light beams pass through the diffractive surface, however, there are tasks as follows:
1. To reduce the difference between diffraction efficiencies caused by a wavelength difference between the light beams
2. To keep a scanning-line interval between the light beams uniform
3. To reduce a beam-spot diameter When a diffractive surface of first order is designed, the difference between the diffraction efficiencies caused by the wavelength difference is smaller as the size of the diffractive surface is smaller. If it is considered to stabilize a beam waist position when a plurality of light beams is used, it is preferable to set the diffractive surface on only one surface of the first optical system. For example, when a plurality of semiconductor lasers each with its median of 780 nanometers is used, the specification of the semiconductor laser becomes usually 780−10/+15 nanometers, and a difference of about 25 nanometers at maximum may possibly occur. At this time, if the diffractive surface is provided on only one surface, then a difference between the diffraction efficiencies becomes 0.35%, and this value falls within the allowable level even for the optical scanning device capable of high image quality.

However, if two diffractive surfaces are used, a difference between the diffraction efficiencies becomes 0.7%, which causes problems in the optical scanning device for high image quality. If a plurality of light beams is used, to reduce the variation of a scanning-line interval between the light beams caused by a wavelength difference and to reduce the beam-spot diameter of the light beams, it is good to provide the diffractive surface on only one surface in the first optical system.

Although the case where a resin lens is used as the scanning lens is explained above, a glass lens can be used for the scanning lens.

The coupling optical element is generally the smallest among the optical elements of the optical scanning device. When the diffractive optical surface is used for the scanning lens, micromachining for its diffraction grating is provided over the wide area of the surface, and this complicated manufacturing process causes cost increase. Even if the diffraction grating is ruled on the minimum area of the coupling optical element of which effective area is small, or even if the diffraction grating is ruled on the scanning lens, equivalent effect of compensating a focus position can be provided. Because of this reason, the diffractive optical surface is desirably applied to the coupling optical element.

The diffractive optical surface has a step structure, i.e., a multi-step type structure. The multi-step type indicates a step-like shape in which the angle of each bent portion is 90 degrees and which is symmetric with respect to the optical axis. The step-like shape is specific to the diffractive surface, and the way to mold it is therefore much easier. Because a diffracted light of 0th order and a diffracted light of first order or thereafter are optically the same as each other, the diffractive surface is equivalent to the surface with no power. Therefore, this shape is the most advantageous for molding; however, it is equivalent to a parallel plate with no power and thereby causes reflected light which may possibly be stray light. As a result, this shape can be disadvantageous for optical performance. However, because the diffractive optical surface is used for the exit surface (second surface) of the optical element, this problem can be avoided. In other words, the multi-step type is such an appropriate shape that the stray light can be reduced and the way to mold it is easy. As for the fact that this shape is equivalent to the surface without power, this shape has advantages that the degradation of the optical performance due to decentering can be reduced.

It is difficult for the diffractive optical surface to avoid the decrease of the light-use efficiency due to machining error or wavelength variation of the light source. Hence, according to an embodiment of the present invention, the diffractive surface is employed on only one of surfaces in the optical scanning device having the diffractive optical surface to improve the light-use efficiency. In addition to this, the power of the diffractive surface satisfies the following conditions:

$$|P3| \geq |P1+P2|, \quad (1)$$

$$|P1| > |P1+P2| \text{ and } |P2| > |P1+P2|, \quad (2)$$

and $$P1 \times P3 > 0 \quad (3)$$

where

P1: power of a diffractive portion of a diffractive surface of the resin lens in the main scanning direction or the sub-scanning direction, P2: power of a refractive portion of the diffractive surface in the direction defined by P1, and P3: power of a surface which is not the diffractive surface of the resin lens in the direction defined by P1.

The condition or expression (2) indicates that the expression is set so that the power of the diffractive portion and the power of the refractive portion of the diffractive surface are cancelled out. The expression $|P1|>|P1+P2|$ indicates that the absolute value of the power of the diffractive portion is cancelled by adding the power of the refractive portion thereto. The expression $|P2|>|P1+P2|$ indicates that the absolute value of the power of the refractive portion is cancelled by adding the power of the diffractive portion thereto. In this case, the power of the entire diffractive surface is reduced. Furthermore, by satisfying the expression (1), the power of the entire surface can be distributed to the refractive surface, to obtain an optical element highly resistant to the decentering between the surfaces. By satisfying the expression (3), the degradation of the optical performance due to temperature variation can be corrected.

By satisfying the expression (2), the power of the diffractive surface can be reduced, but the shape of the diffractive surface is gradually close to the step shape. Although the most ideal shape is the step shape, only by satisfying the expression (2), the method of forming the diffractive surface so as not to leave a machined trace like a shaper machining can be employed and the machining time can be reduced. The reduction of the machining time has a secondary advantage such as reduction of heat generation during machining, and thus it is preferable to obtain the high-precision diffractive surface. Moreover, the diffractive surface can be finished very smoothly, and the surface precision of the diffractive surface is thereby enhanced. Thus, scattered light and increase of the beam-spot diameter hardly occur.

In the multibeam optical system in particular, it is necessary to prevent ghost light produced by light beams on one side from entering the light source on the other side, and as a structure against this case, the structure mentioned above is very effective. Furthermore, because the power of the entire diffractive surface is reduced, it is possible to achieve satisfactory optical characteristics such that even if the positions of a diffraction lens through which light beams pass are different, the light beams are hardly affected by the decentering between the surfaces.

The vertical-cavity surface-emitting laser (VCSEL) is used as the light source of the optical scanning device. In this case, if the number of light beams to be emitted is increased more and more, the cost per light beam can be reduced as compared with the semiconductor laser (LD) array using a plurality of edge-emitting type of semiconductor lasers. Furthermore, because the VCSEL has a very short resonator length, mode hopping is hard to occur as compared with the LD array, and also the VCSEL can be configured so that the mode hopping will not occur in principle. Therefore, quality degradation of optical scanning due to wavelength variation can be reduced. Particularly, when the VCSEL is used for the optical system using the diffractive optical element in which the optical characteristics largely change caused by the change of the wavelength, excellent optical scanning can be preformed because there is no mode hopping.

By arranging the light emitting points in the light source at equal spacing in the sub-scanning direction, the positions of the light emitting points in the sub-scanning direction can be covered by one light source. Therefore, overlapping of the light beams can be eliminated. Besides, because there is no need to adjust the rotation of the light source to control the scanning-line interval, the yield ratio is improved and the cost of the device can be reduced.

The positions where images are formed with a plurality of light beams can be set at equal spacing on a surface to be scanned, and the intervals between the scanning lines in the sub-scanning direction can be made the same. Thus, uniform optical scanning can be performed. For example, an optical scanning device having a writing density of 2400 dpi is considered. If the light source has 32 light emitting points, a width scanned by one scanning is 25.4/2400*32=0.339 millimeter. When a difference in magnification between image heights is 1%, a difference between scanning-line variations is 3.4 micrometers. This value is about one third of a scanning-line interval of 10.6 micrometers, and falls within an allowable range even including variations due to the manufacturing error and temperature variation. If the magnification increases, the variation is multiplied accordingly and appears in this manner. Therefore, if the error in the magnification is more than that, the quality of optical scanning is detracted. Thus, in the scanning optical system, a difference between image heights in the lateral magnification in the sub-scanning direction is desirably 1% or less.

With the optical scanning device according to an embodiment of the present invention, it is possible to provide an image forming apparatus with a simple configuration capable of high-speed and high-density image formation at low cost. Through such an image forming apparatus, high-quality images can be obtained because all of a plurality of light beams becomes stable small beam spots even if the temperature varies, the scanning-line interval between the light beams can be stably acquired, and optical scanning with less difference in light amounts between multibeams can be performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a light source that includes light emitting points for emitting a plurality of light beams;
a first coupling optical element that couples the light beams into a light flux;
a deflecting unit that deflects and scans the light flux; and
a scanning optical system that focuses the light flux from the deflecting unit onto an imaging surface to form an image, wherein
$F \tan(\theta/2)+A<D/0.7$ is satisfied where A is a maximum distance between the light emitting points and an optical axis of the first coupling optical element, $\theta$ is a full-width half-maximum divergence angle of the light beams, F is a focal length of the first coupling optical element, and D is an effective radius of the first coupling optical element.

2. The optical scanning device according to claim 1, further comprising a second coupling optical element that is made of resin and has one diffractive optical surface, wherein
the second coupling optical element has a first surface and a second surface, the second surface being the diffractive optical surface;
the second surface has a step structure with planes which are substantially horizontal or substantially vertical with respect to an optical axis of the second coupling optical element, and has almost no power.

3. The optical scanning device according to claim 2, wherein the second coupling optical element satisfies:

$$|P3| \geq |P1+P2|, \qquad (1)$$

$$|P1|>|P1+P2| \text{ and } |P2|>|P1+P2| \qquad (2)$$

$$P1 \times P3 > 0 \qquad (3)$$

where P1 is power of a diffractive portion of the second surface in a main scanning direction or a sub-scanning direction, P2 is power of a refractive portion of the second surface in the direction defined by P1, and P3 is power of the first surface in the direction defined by P1.

4. The optical scanning device according to claim 1, wherein the light source is a vertical-cavity surface-emitting laser.

5. An image forming apparatus that forms an image by an electrophotographic process including an exposure process, the image forming apparatus comprising:
the optical scanning device according to claim 1 that performs the exposure process.

6. An image forming apparatus comprising:
a plurality of image forming stations that forms images of different colors to be superimposed one upon another to form a full color image, respectively, by an electrophotographic process including an exposure process; and
the optical scanning device according to claim 1 that performs the exposure process.

* * * * *